United States Patent [19]

Ishigaki

[11] Patent Number: 5,402,442
[45] Date of Patent: Mar. 28, 1995

[54] RECEIVING DEVICE FOR RECEIVING AND DEMODULATING SPREAD SPECTRUM-MODULATED GPS WAVE

[75] Inventor: Yukinobu Ishigaki, Miura, Japan

[73] Assignee: Victor Company of Japan, Ltd., Yokohama, Japan

[21] Appl. No.: 266,253

[22] Filed: Jun. 27, 1994

[30] Foreign Application Priority Data

Jun. 28, 1993 [JP] Japan .................................. 5-181860
Sep. 28, 1993 [JP] Japan .................................. 5-265704

[51] Int. Cl.$^6$ ........................ H04L 27/30; G01S 5/02; H04B 7/185
[52] U.S. Cl. .................................... 375/200; 380/34; 342/352; 342/357
[58] Field of Search ............ 375/1; 380/34; 342/352, 342/356, 357

[56] References Cited

U.S. PATENT DOCUMENTS

| | | | |
|---|---|---|---|
| 4,785,463 | 11/1988 | Janc et al. | 375/1 |
| 4,821,294 | 4/1989 | Thomas, Jr. | 375/1 X |
| 4,894,662 | 1/1990 | Counselman | 342/357 |
| 5,093,839 | 3/1992 | Kohno et al. | 375/1 |
| 5,134,407 | 7/1992 | Lorenz et al. | 342/352 |
| 5,185,610 | 2/1993 | Ward et al. | 342/357 |
| 5,293,170 | 3/1994 | Lorenz et al. | 342/352 |
| 5,343,210 | 8/1994 | Marcuard | 342/352 |
| 5,347,284 | 9/1994 | Volpi et al. | 342/356 |

OTHER PUBLICATIONS

Journal of The Institute of Navigation, vol. 25, No. 2, Summer 1978, pp. 95-106, "Principle of Operation of NAVSTAR and System Characteristics", by R. J. Milliken and C. J. Zoller.
Journal of The Institute of Navigation, vol. 25, No. 2, Summer 1978, pp. 121-146, "GPS Signal Structure and Performance Characteristics", by J. J. Spilker, Jr.
Journal of the Institute of Navigation, vol. 28, No. 4, Winter 1981-1982, pp. 353-369, "Applications of a Multiplexed GPS User Set", by C. R. Johnson, Phillip W. Ward, Michael D. Turner and Steven D. Roemerman.

*Primary Examiner*—Bernarr E. Gregory
*Attorney, Agent, or Firm*—Michael N. Meller

[57] ABSTRACT

A receiving device for receiving spread spectrum-modulated GPS signal transmitted from GPS (Global Positioning System) satellites to the earth. Received GPS signals are converted into IF signals which are despread-demodulated on the basis of C/A codes, resulting in demodulated PSK signals. Carriers are reproduced from the IF signals and a clock signal for C/A code generator is produced from the reproduced carrier and a local oscillation signal. The PSK signal is demodulated on the basis of a reference frequency of a PLL circuit to obtain a navigation message.

11 Claims, 6 Drawing Sheets

RECEIVING DEVICE FOR RECEIVING AND DEMODULATING SPREAD SPECTRUM-MODULATED GPS WAVE

BACKGROUND OF THE INVENTION

1. Field of the Invention

The present invention relates to a receiving device for receiving and demodulating GPS (Global Positioning System) waves which are spread spectrum-modulated and transmitted from GPS satellites to the earth.

2. Description of the Prior Art

The GPS satellite which was developed originally for military use has been partially opened for public use for finding the position of an object on the ground or in the ocean. A position finder which utilizes GPS waves has been used in a ship or car navigation system and in a portable position finding system, etc. The position is measured with very high precision. Recently, portable position finding systems have found many more uses and a bright future for the development of such systems is foreseen.

Electromagnetic waves transmitted from a GPS satellite include a carrier modulated with a spread-modulated signal obtained by spread-modulating a navigation message using two kinds of diffusion codes, C/A (Clear and Acquisition) code and P (precision) code which is for military purpose and is not open. There are a plurality of GPS satellites in the sky today and the C/A code and P code for each satellite is different.

A current position can be obtained by simultaneously receiving electromagnetic waves from at least three of these GPS satellites and calculating the distances from these satellites on the basis of the times of propagation for the signal from these satellites to a receiver and the propagation speed of the electromagnetic wave.

Figure 1:
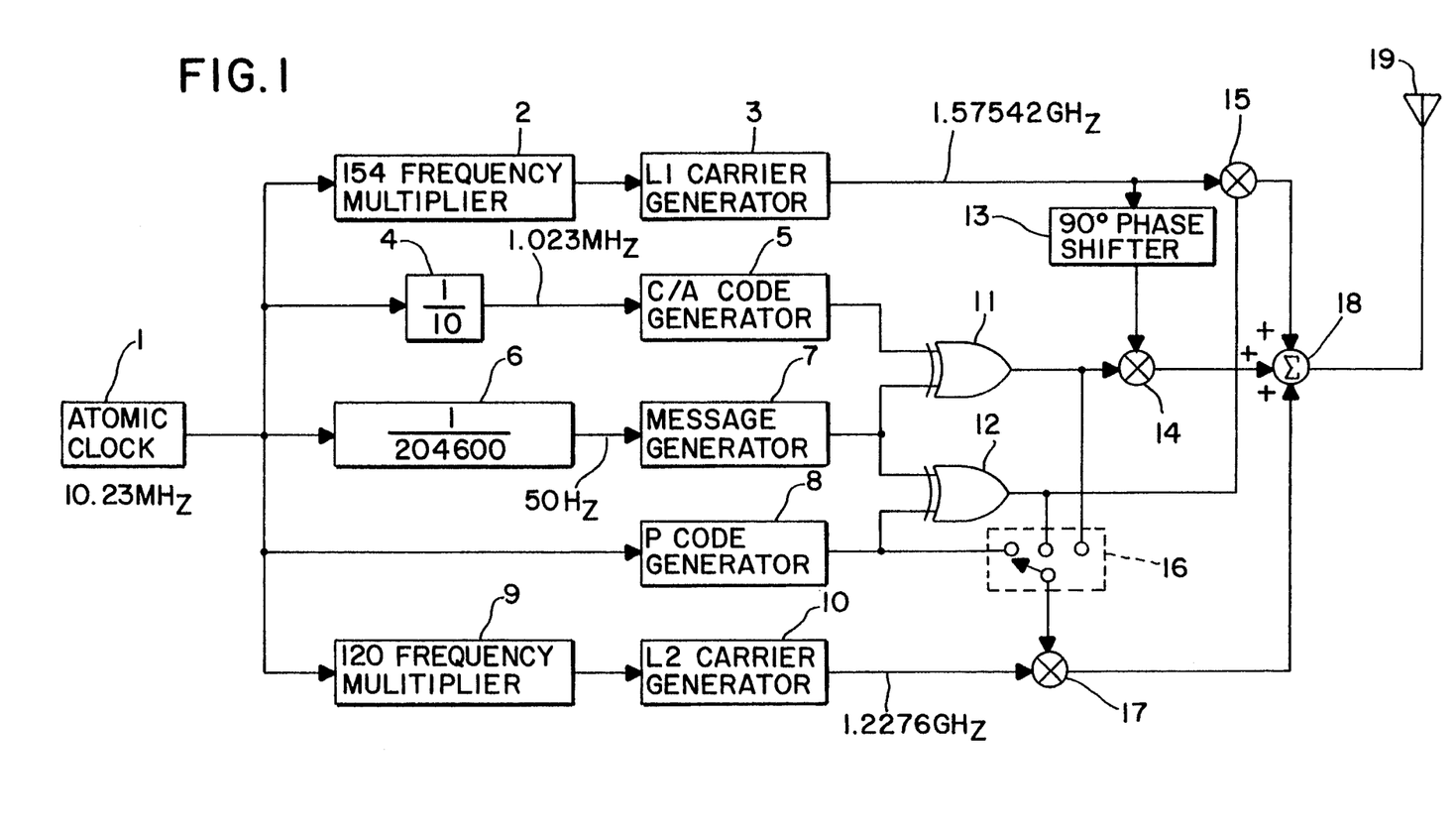
FIG. 1 is a block diagram showing a construction of a transmitter in a GPS satellite.

FIG. 1 shows a transmitter on a GPS satellite. The transmitter transmits a signal whose spectrum is spread by two carriers, the so-called L1 carrier having a center frequency of 1.5754 GHz and the L2 carrier having a center frequency of 1.2276 GHz.

A cesium atomic clock which vibrates very stably is used as an atomic clock 1. The atomic clock 1 oscillates at a reference frequency of 10.23 MHz and the carriers and the respective codes are produced from the reference frequency.

The L1 carrier is obtained from an L1 carrier generator 3 after multiplying the reference frequency generated by the atomic clock 1 by 154 in a 154 frequency multiplier 2 (center frequency 1.57542 GHz=10.23 MHz×154).

The spread code (C/A code) of 1.023 Mbps and of period of 1023 chips is generated by dividing the reference frequency by 10 in a 1/10 frequency divider 4 to generate a clock of 1.023 MHz and supplying the clock to a C/A code generator 5.

The navigation message inherent to the satellite is generated as data of 50 bps by dividing the reference frequency by 204600 in a 1/204600 frequency divider 6 and supplying it to a message generator 7.

P code is generated by a P code generator 8 which uses the reference frequency as its clock signal. Although the P code is not opened publicly as mentioned previously, it is a spread code having a code length as large as $6.187104 \times 10^{12}$ chips corresponding to about one week.

The L2 carrier is obtained from an L2 carrier generator 10 after multiplying the reference frequency by 120 in a 120 frequency multiplier 9 (1.2276 GHz=10.23 MHz×120).

The C/A code and the navigation message thus generated are supplied to an Exclusive OR (Ex-OR) gate 11 from which the message is obtained as a spread-modulated signal. The spread-modulated signal is modulated by multiplying it with a carrier which is the L1 carrier phase-shifted by 90° by means of a 90° phase shifter 13 and the resultant signal is supplied to an adder circuit 18.

The P code is also supplied, together with the navigation message, to an Ex-OR gate 12 from which the message is obtained as a spread-modulated signal. This spread-modulated signal is modulated by multiplying it with the L1 carrier by a multiplier 15 and the resultant signal is supplied to the adder circuit 18.

Moreover, the P code and the respective outputs of the Ex-OR gates 11 and 12 are selected by a switch 16 which is controlled by the station on the earth. This selected signal is modulated by multiplying it with the L2 carrier by a multiplier 17 and the resultant signal is supplied to the adder circuit 18.

The respective modulated outputs are summed in the adder circuit 18 and transmitted through a transmission antenna 19 to the earth.

In a receiver on the earth, the electromagnetic wave thus transmitted from the transmitter is converted into an intermediate frequency by a frequency circuit of the receiver. It is then reverse despread-demodulated according to a C/A code output from a demodulation C/A code generator. Thereafter, the demodulated signal is further Phase-Shift Keying (PSK) demodulated to restore the navigation message.

The thus obtained navigation message is applied to a microcomputer in the receiver from which various necessary information is reproduced. The demodulation C/A generator further generates codes related to respective satellites from which navigation messages are transmitted to be received by the receiver. Switching between the satellites is controlled by the microcomputer. The most important function of the receiver is to generate C/A codes synchronized with the C/A codes of satellites transmitting messages thereto.

In a conventional receiver of this type, a synchronizing device or sync holding device is used to generate a C/A code synchronized with the C/A code of a related satellite. A delay locked loop is generally used as the sync holding device.

However, the circuit construction of the synchronizing or sync holding device of such a conventional receiver is complicated. It is also difficult to operate a delay locked loop used as the sync holding device stably with respect to the field strength of different electromagnetic waves transmitted from different satellites.

Therefore, it is usual to use a sync holding device which operates at a certain threshold value of a certain electric field strength of a received signal. However, a dynamic range of such sync holding device with respect to electric field strength of the received signal is low despite its voluminous whole circuit construction. In addition, it is difficult to receive electromagnetic waves from a plurality of satellites with correct timing, depending upon the orbital positions of the respective satellites.

BRIEF SUMMARY OF THE INVENTION

1. Object of the Invention

An object of the present invention is to provide a receiving device which has a simple circuit construction and is capable of receiving GPS waves from a plurality of GPS satellites stably with correct timing.

2. Brief Summary

In order to achieve the above object, according to the present invention, a carrier is reproduced from a PSK signal detected from an electromagnetic wave transmitted from a GPS satellite by means of a Phase Locked Loop (PLL) circuit. A clock signal is generated from the reproduced carrier and a local oscillation signal and the clock signal is supplied to a C/A code generator means.

That is, in a first aspect of the present invention, a receiving device comprises a C/A code generator means for generating a C/A code corresponding to that of an aimed GPS satellite on the basis of a clock signal. Frequency conversion means are provided for converting a received GPS electromagnetic wave into an intermediate frequency signal by means of a local oscillation signal. Despread-demodulation means is included for obtaining a PSK signal by performing a despread-demodulation by multiplying the intermediate frequency signal with a C/A code generated by the C/A code generator means. Also included are carrier reproducing means for reproducing a carrier of the PSK signal from the PSK signal. Clock signal generator means generates a clock signal from the reproduced carrier and the local oscillation signal and supplies the clock signal to the C/A code generator means and demodulation means for demodulating GPS data from the frequency of the reproduced carrier and the PSK signal.

In a second aspect of the present invention, a receiving device comprises C/A code generator means for generating a C/A code corresponding to that of an aimed GPS satellite on a basis of a clock signal. First frequency conversion means converts a received GPS electromagnetic wave into a first intermediate frequency signal by means of a local oscillation signal. Second frequency conversion means converts the first intermediate frequency signal into a second intermediate frequency signal by means of the local oscillation signal. Despread-demodulation means obtains a PSK signal by performing the despread-demodulation by multiplying the second intermediate frequency signal with the C/A code generated by the C/A code generator means. Carrier reproducing means reproduce a carrier of the PSK signal from the PSK signal obtained from the despread-demodulation means. Clock signal generator means generates a clock signal from the reproduced carrier and the local oscillation signal and supplies the clock signal to the C/A code generator means and demodulation means for demodulating GPS data from a frequency of the reproduced carrier and the PSK signal.

The above and other related objects and features of the present invention will be apparent from a reading of the following description of the disclosure found in the accompanying drawings and the novelty thereof pointed out in the appended claims.

DETAILED DESCRIPTION OF THE INVENTION

Preferred embodiments of the present invention will be described with reference to the accompanying drawings.

First Embodiment

Figure 2:
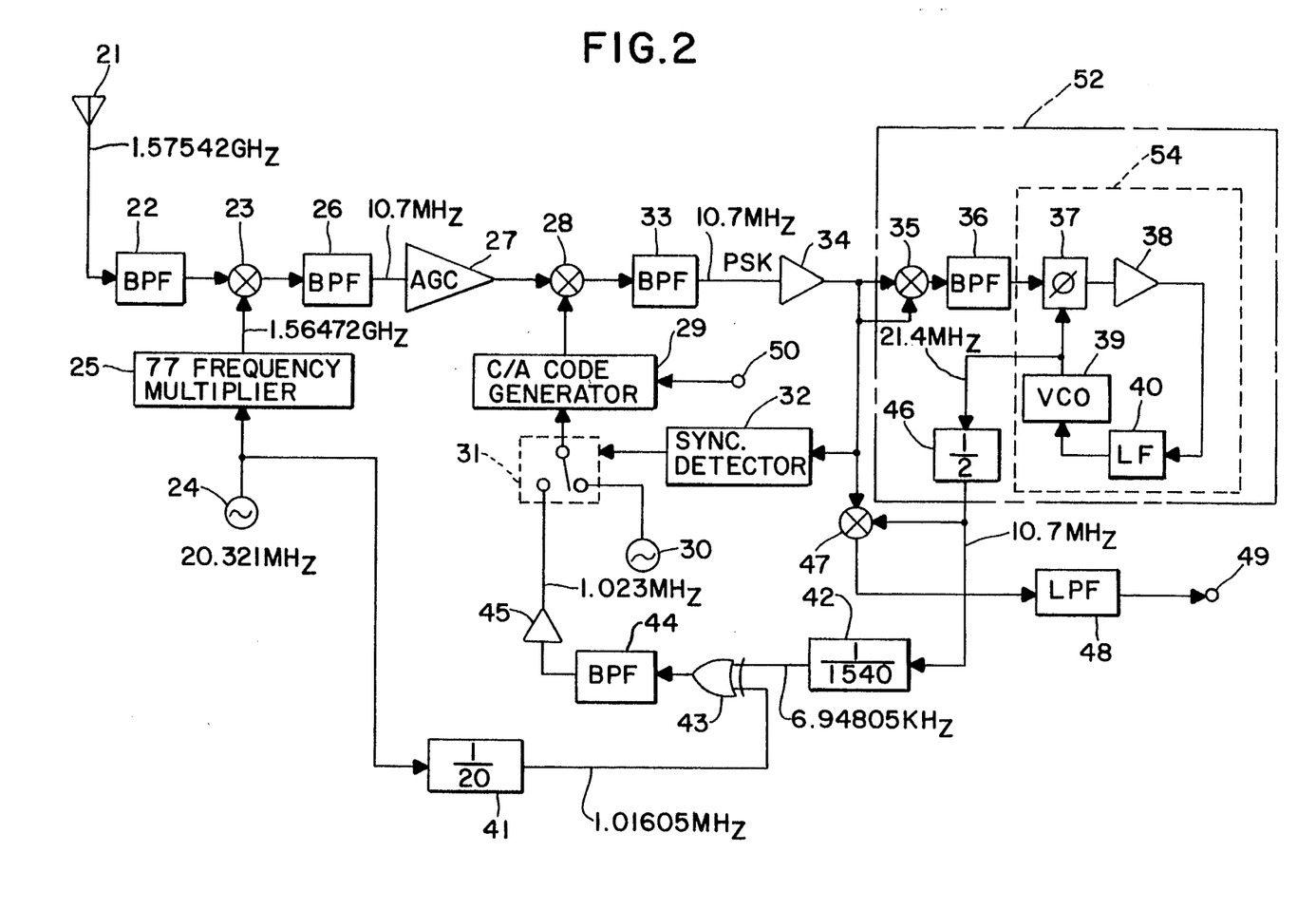
FIG. 2 is a block diagram showing a first embodiment of a receiving device according to the present invention.

FIG. 2 is a block diagram showing a first embodiment of a receiver according to the present invention, which receives an L1 carrier of a GPS wave from a GPS satellite at an antenna 21 and generates a synchronized C/A code.

In FIG. 2, reference numeral 21 depicts the receiving antenna, 22, 26, 33 and 44 are band-pass filters (BPFs), 23 a frequency conversion mixer, 24 a local oscillator, 25 a frequency multiplier, 27 an automatic gain control (AGC) circuit, 28 a multiplier for despread-demodulation, 29 a receiving C/A code generator, 30 an oscillator for synchronization, 31 a switch, 32 a synchronous detector, 34 and 45 amplifiers, 35 and 47 multiplier circuits, 37 a phase comparator, 38 a D.C. amplifier, 41, 42 and 46 are frequency dividers, 43 an Ex-OR gate, 48 a low-pass filter (LPF), 49 an output terminal, 50 an input terminal, 52 a carrier reproducing circuit and 54 a phase-locked loop (PLL) circuit.

The L1 carrier (having a center frequency of 1.57542 GHz) of a signal transmitted from a GPS satellite and received at the receiving antenna 21 is supplied through the band-pass filter (BPF) 22 to the mixer 23 for frequency conversion. The L1 carrier supplied to the frequency conversion mixer 23 is mixed with a frequency multiplied local oscillator signal obtained from the local oscillator 24 and the frequency multiplier 25, resulting in an intermediate frequency (IF) signal.

In this embodiment, a local oscillation signal (20.321 MHz) generated by the local oscillator 24 is multiplied by 77 by the frequency multiplier 25 to obtain a frequency multiplied local oscillation signal (1.567472 GHz) and the received L1 carrier (1.57542 GHz) is converted into the IF signal [10.7 MHz (=1.57542 GHz−1.56472 GHz)] which is output through the BPF 26.

The output signal of the BPF 26 is amplified by the automatic gain control (AGC) circuit 27 to obtain a constant amplitude and waveform shaped signal. Then, the waveform shaped, constant amplitude signal is applied to the multiplier 28 for despread-demodulation. The multiplier 28 multiplies the output signal of the AGC circuit 27 with a C/A code (spread code) generated by the receiving C/A code generator 29 to perform a despread-demodulation and the despread-demodulated signal is supplied to the BPF 33. A PSK signal demodulated is obtained at an output of the BPF 33. The PSK signal is supplied through the amplifier 34 to the carrier reproducing circuit 52 composed of the multiplier 35, the BPF 36, the phase comparator 37, the D.C. amplifier 38, a loop filter (LF) 40, a voltage controlled oscillator (VCO) 39 and the frequency divider 46.

The phase comparator 37, the D.C. amplifier 38, the loop filter (LF) 40 and the voltage controlled oscillator 39 constitute a phase-locked loop (PLL) circuit 54. The oscillator 39 oscillates at 21.4 MHz.

Since the PSK signal has two phase variation, 0 and $\pi$, such phase variation must be canceled out in order to reproduce a carrier. In this embodiment, the frequency of the PSK signal is doubled by the multiplier 35 to change phase $\pi$ to phase $2\pi$. Since $2\pi = 0$, the phase variation is canceled out. The output signal of the BPF 36, whose phase variation is canceled, has a doubled frequency (21.4 MHz) with varying amplitude. The variation of amplitude is removed by the PLL circuit 54, resulting in a constant amplitude, doubled frequency signal.

The frequency of 21.4 MHz of the signal from the oscillator 39 of the PLL circuit 54 is divided by 2 by the frequency divider 46, resulting in a reference frequency signal of 10.7 MHz. This means that the carrier frequency of the PSK signal is reproduced. The reproduced carrier frequency from the divider 46 is further divided by 1540 by the frequency divider 42 to obtain a frequency of 6.94805 Khz which is supplied to the EX-OR gate 43.

On the other hand, the local oscillation signal of 20,321 MHz from the local oscillator 24 is divided in frequency by 20 by the frequency divider 41 to obtain a signal of 1.01605 MHz which is supplied to the Ex-OR gate 43. Therefore, the Ex-OR gate 43 multiplies these two signals with each other and a signal frequency of 1,023 MHz is obtained from the BPF 44, which is the sum of these two signals.

This signal frequency is equal to a frequency of the clock signal supplied to the receiving C/A code generator 29. Therefore, the output of the BPF 44 is supplied through the amplifier 45 and the switch 31 to the receiving C/A code generator 29 as the clock signal. The C/A code generator 29 generates a C/A code equivalent to that of the GPS satellite and the despread-demodulation is performed in the multiplier 28.

Synchronization at the start time of receiving is performed by selecting $1,023 \text{ MHz} + \Delta f$ output from the synchronizing oscillator 30 by the switch 31 and supplying it to the C/A code generator 29 as the clock signal. Therefore, a code synchronization is performed at a frequency which differs from a normal clock frequency by $+\Delta f$. That is, the PSK output of the BPF 33 is a binary output which becomes a signal having high level at a synchronized point (correlation point) and having spread-modulated lower level at a non-correlation point.

Therefore, the correlation point of this output signal is detected by the amplifier 34 and the synchronous detector 32, at which time the switch 31 is switched to the side of the normal clock signal, so that the normal clock signal is supplied to the C/A code generator 29.

A code switching control signal is further supplied through the input terminal 50 to the C/A code generator 29. This control signal corresponds to the satellite from which the signal is being received. Therefore, signals from a plurality of GPS satellites are received selectively. The reproduced carrier having its frequency divided by 2 by the frequency divider 46 is multiplied with the PSK signal from the amplifier 34 by the multiplier 47. This performs a PSK demodulation upon which a navigation message, which is obtained by demodulating the PSK signal, is obtained from the output of the low-pass filter (LPF) 48, which is output through the output terminal 49.

As described, the clock signal of the C/A code generator means is generated by utilizing the output of the PLL circuit 54 for carrier reproduction. Thus the clock signal has no influence on the local oscillation signal which is not synchronized with the C/A code. The sync holding operation of the PLL circuit 54 which reproduces the carrier, also holds synchronization of the C/A code generation means. Therefore, the GPS waves from a plurality of GPS satellites can be received stably with correct timing by the receiver having simple circuit construction, without necessity of providing a sync holding device such as the conventional delay locked loop.

Second Embodiment

Figure 3:
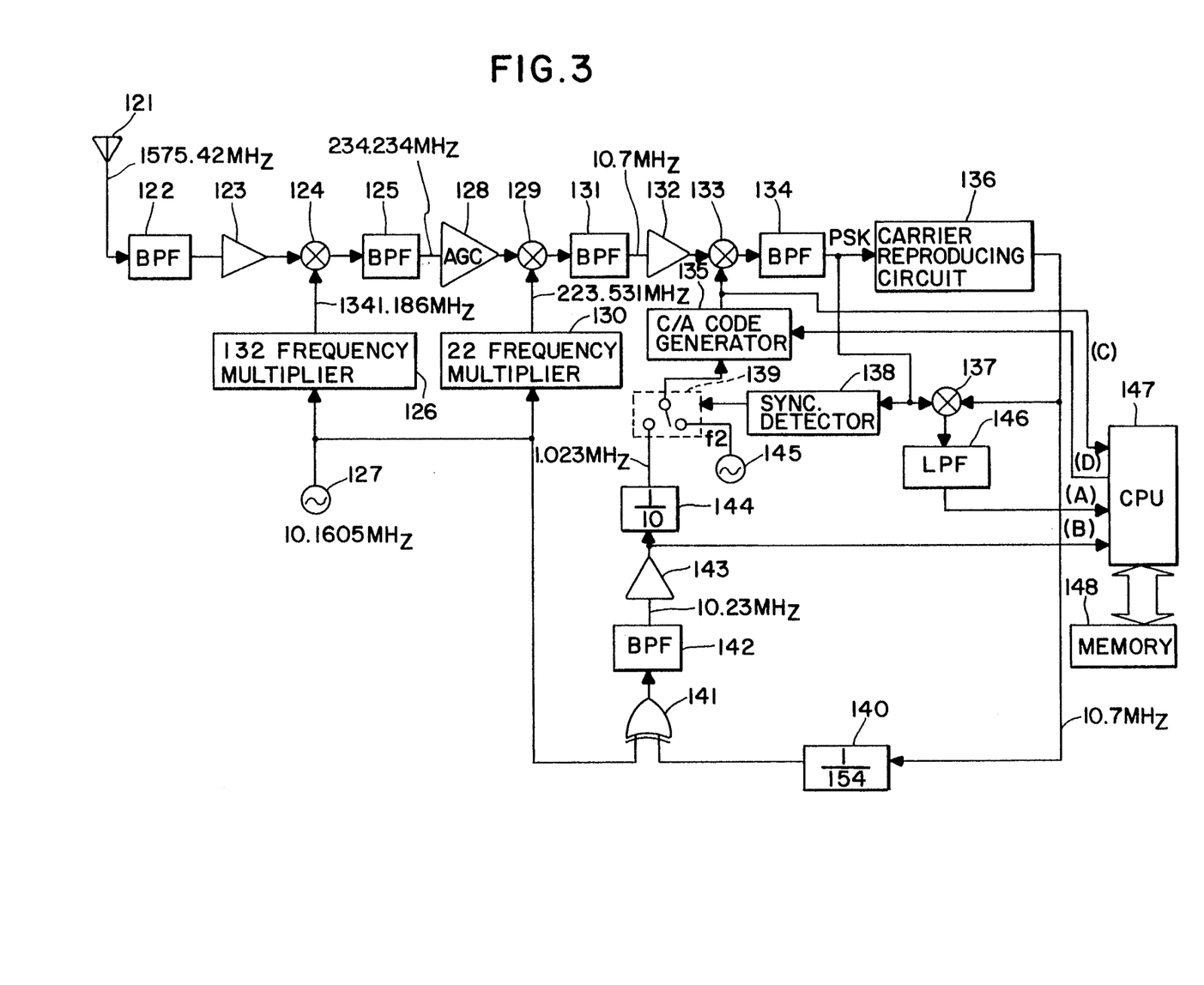
FIG. 3 is a block diagram showing a second embodiment of a receiving device according to the present invention.

FIG. 3 is a block diagram showing a second embodiment of a receiving device according to the present invention. The L1 carrier of GPS waves from GPS satellites is received at a receiving antenna 121 and synchronizes a C/A code as in the first embodiment shown in FIG. 2.

In FIG. 3, 121 depicts the receiving antenna, 122, 125, 131, 134 and 142 band-pass filters (BPFs), 123 a high frequency amplifier, 124 a first mixer for frequency conversion, 126 a first frequency multiplier, 127 a local oscillator, 128 an automatic gain control (AGC) circuit, 129 a second mixer for frequency conversion, 130 a second frequency multiplier, 132 an intermediate frequency amplifier, 133 a multiplier for despread-demodulation, 135 a C/A code generator, 136 a carrier reproducing circuit, 137 a multiplier, 138 a synchronous detector, 139 a switch, 140 and 144 frequency dividers, 141 an Ex-0R gate, 143 an amplifier, 145 an oscillator for synchronization, 146 a low-pass filter (LPF), 147 a central processing unit (CPU) and 148 a memory.

The L1 carrier (center frequency is 1575.42 MHz) of a GPS satellite wave received by the antenna 121 is supplied through the band-pass filter (BPF) 122 and the high frequency amplifier 123 to the first frequency converting mixer 124. On the other hand, a local oscillation signal (10.1605 MHz) generated by the local oscillator 127 is multiplied in frequency by 132 (N1) by the first frequency multiplier 126 to obtain a first, frequency multiplied local oscillation signal (1341.186 MHz) which is supplied to the mixer 124. Therefore, in the mixer 124, the L1 carrier is mixed with the first, frequency multiplied local oscillation signal to obtain an intermediate frequency (IF), on which a first IF signal [234.234 MHz $(= 1575.42 \text{ MHz} - 1341.186 \text{ MHz})$] is obtained through the BPF 125. The first IF signal is supplied to the automatic gain control (AGC) circuit 128 in which a level of the received carrier which depends upon received electric field strength is made substantially constant and then supplied to the second frequency converting mixer 129.

The local oscillation signal (10.1605 MHz) generated by the local oscillator 127 is also supplied to the second frequency multiplier 130 in which it is multiplied by 22

(N2) to produce a second, frequency-multiplied local oscillation signal (223.531 MHz) which is supplied to the mixer 129. Therefore, in the mixer 129, the output (first IF signal) of the AGC circuit 128 is mixed with the second, frequency multiplied oscillation signal and frequency-converted, resulting in a second IF signal [10.7 MHz (=234.234 MHz−223.531 MHz)] from the mixer 129 through the BPF 131.

The second IF signal is amplified suitably by the intermediate frequency amplifier 132 and supplied to the despread-demodulation multiplier 133 in which a despread-demodulation is performed by multiplying it with the C/A code (spread code) generated by the receiving C/A code generator 135. The demodulated signal is supplied to the BPF 134. A demodulated PSK signal is obtained from an output of the BPF 134 and supplied to the carrier reproducing circuit 136.

Since the C/A code generator 135 generates a C/A code initially (prior to synchronization) by using the output of the synchronizing oscillator 145 as a clock, the period of the C/A code is slightly different from that of the C/A code generated in the GPS satellite.

Further, a position is measured by receiving electromagnetic waves from a plurality (at least three) of GPS satellites. In such case, the receiving and demodulation are performed by using a single demodulator circuit while switching receiving time (multiplex system) or using a plurality of demodulation circuits to demodulate the waves simultaneously (multichannel system). For simplicity of description, the multiplex system will be described.

Since the clock signal frequency f1 of the C/A code generator in the GPS satellite is 1.023 MHz which is obtained by dividing the oscillation frequency (10.23 MHz) of the atomic clock by 10, as mentioned previously, an oscillation frequency of the oscillator 145 is set to a variable frequency f2, which is close to f1, as a sliding correlation frequency and the frequency f2 is supplied to the C/A code generator 135 through the switch 139.

The C/A code generated by the C/A code generator 135 is set according to a control signal (D) from the central processing unit (CPU) 147 and the CPU 147 and the synchronous detector 138 search the receiving C/A code by using the oscillation signal having the sliding correlation frequency f2 as a clock.

When the receiving C/A code is found, the control to be performed by the CPU 147 for changing frequency is stopped and synchronous detection of C/A code is performed. At a time when it is synchronized, the switch 139 is switched to the output of the frequency divider 144 and the synchronization of the C/A code is established by the sync holding operation by a synchronous round loop.

Immediately after information from the GPS satellite is stored in the memory 148 of the CPU 147, the operation is switched to a receiving operation for the GPS satellite. In this case, the C/A code is also switched and similar synchronous detection and synchronization are performed. After information of the plurality (at least three) of the GPS satellites is stored in the memory 148, a calculation of position is performed on the basis of the stored information.

The operation from synchronous detection to synchronization will be described in more detail.

For synchronous detection, the output of the multiplier 133 through the BPF 134 is monitored. Synchronous detection is achieved during a period in which the oscillation signal of sliding correlation frequency f2 from the oscillator 145 is being supplied to the multiplier 133 through the switch 139 and the C/A code generator 135, becomes a peak value at the correlation point and is spread and low level at non-correlation point.

The correlation peak is detected in the sync detector 138 by using the difference in level and the switch 139 is switched to the side of the frequency divider 144.

On the other hand, the output (PSK signal) of the BPF 134 is supplied to the carrier reproducing circuit 136 to reproduce the carrier (frequency is 10.7 MHz). The carrier reproducing circuit 136 may be of the frequency multiplying system or the costas-loop system, both of which utilize PLL and also have tracking filter functions as PLL.

The carrier reproduced by this carrier reproducing circuit 136 is divided by 154 by the frequency divider 140 and a resultant signal having frequency of 69.4805 KHz is supplied to the Ex-OR gate 141 in which it is multiplied with the oscillation signal (10.1605 MHz) of the local oscillator 127. The output of the EX-OR gate 141 is passed through the BPF 142, resulting in a signal having frequency of 10.23 MHz, that is, 10.1605 MHz+69.4805 KHz.

This frequency is the frequency of the reference signal from the atomic clock of the GPS satellite. The output signal of the BPF 142 is amplified by the amplifier 143 and then supplied to the CPU 147 as a signal (B) and to the 1/10 frequency divider 144 an output of which is supplied through the switch 139 to the C/A code generator 135 as a C/A code generating clock signal. The C/A code generated by the C/A code generator 135 is supplied to the multiplier 133 and the CPU 147 as a signal (C).

Figure 4:
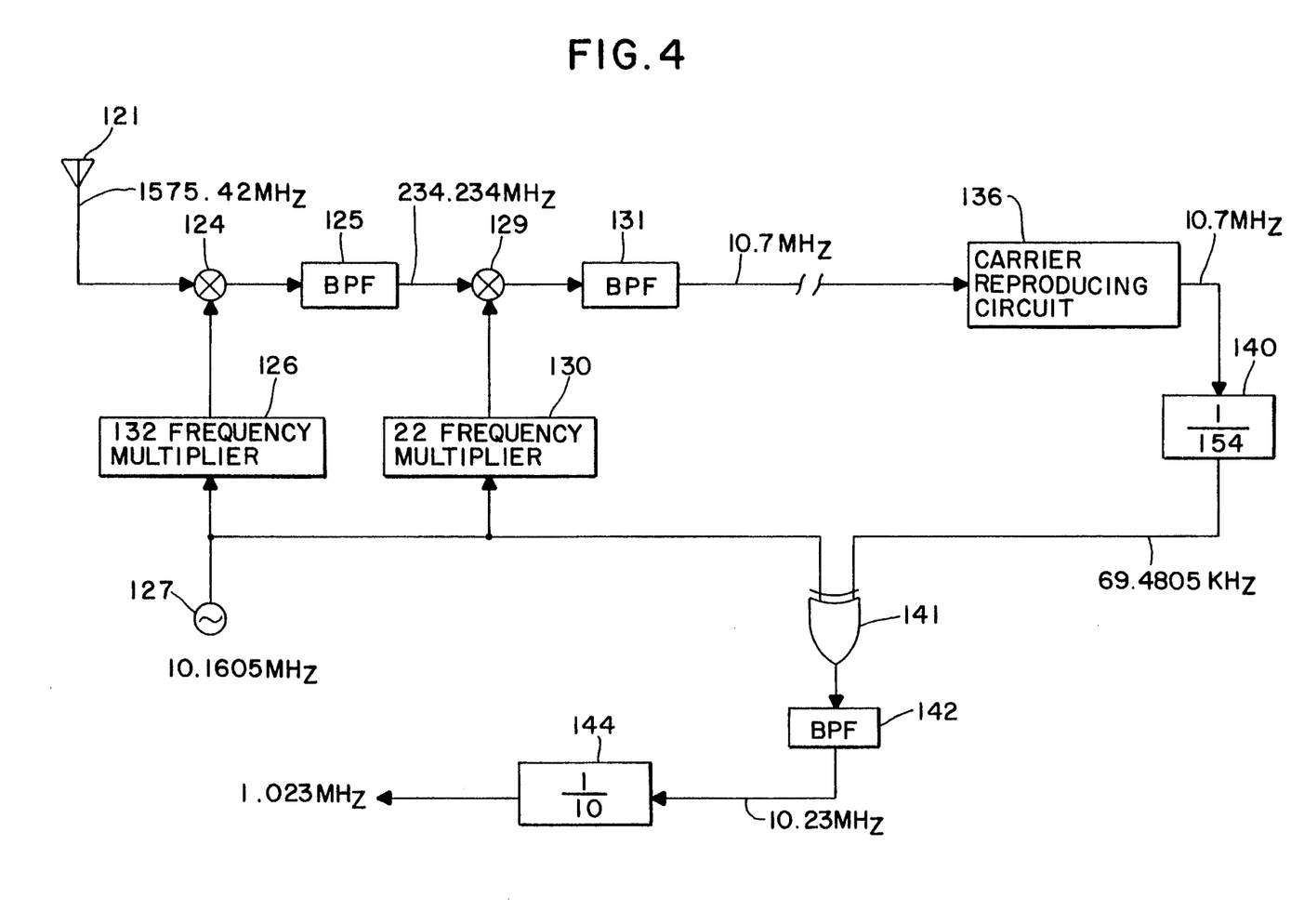
FIG. 4 is a block diagram of a main portion of the second embodiment of the receiving device of the present invention shown in FIG. 3, showing a detail thereof.

Frequency generations in the respective portions of the receiving device according to the second embodiment shown in FIG. 3 will be described by also referring to FIG. 4 which is a block diagram of a portion of the receiving device in FIG. 3, which is necessary for explanation thereof.

In the second embodiment, the frequency conversion is performed by using the double superheterodyne. Frequency to be used in a first frequency conversion stage is the local oscillation signal frequency (10.1605 MHz) from the local oscillator 127 multiplied by 132 by the first frequency multiplier 126. The frequency to be used in a second frequency conversion state is the local oscillation signal frequency multiplied by 22 by the second frequency multiplier 130. That is, the local oscillation signal frequency is multiplied by 154=132+22.

Therefore, the frequency of the IF signal in the first stage is 234,234 MHz and that in the second stage is 10.7 MHz. Thus, the basic frequency of the output of the 1/154 frequency divider 140 becomes 69.4805 KHz. Further, since the Ex-OR gate 141 functions as a multiplier, a sum component of the output of the Ex-OR gate 141 has a frequency of 10.23 MHz which is equal to that of the atomic clock in the satellite. Therefore, by dividing the frequency by 10 as in a modulator portion of the GPS satellite, a frequency of 1,023 MHz is obtained as the clock signal frequency of the C/A code generator.

Individual message information modulated in the GPS satellites are demodulated in synchronism by multiplying the reproduced carrier from the carrier reproducing circuit 136 with the PSK signal from the BPF 134 in the PSK demodulating multiplier 137 and then extracted by the LPF 146 in the next stage and supplied to the CPU 147 as the signal (A).

Information necessary for measurement of position can be obtained by calculation based on the demodulated message information of the respective satellites, carrier frequency and measured data of time delay of the C/A code.

Summarizing, the features of the second embodiment are as follows:

(1) Frequency heterodyne necessary for signal receiving and demodulation of received signal is double superheterodyne.

(2) Frequency of local oscillation signal is multiplied by multiplier equal to that used in a transmitting device in a satellite.

(3) Frequency equal to frequency of an atomic clock within a satellite is generated in a simple manner by canceling the influence of frequency of local oscillation signal.

The sync holding of the C/A code in the conventional receiving device is performed by using a dedicated and indispensable sync holding device such as delay locked loop (DLL) or tau dither loop (TDL). In the present invention, however, the PLL (having a very narrow loop band) included in the carrier reproducing circuit used for PSK demodulation also operates to hold synchronization of the C/A code and therefore the sync holding device used in the conventional receiving device is unnecessary.

[Modification 1]

Although the second embodiment shown in FIG. 3 has the double superheterodyne construction, it is possible to construct the second embodiment by using the single superheterodyne construction used in the first embodiment shown in FIG. 2.

Figure 5:
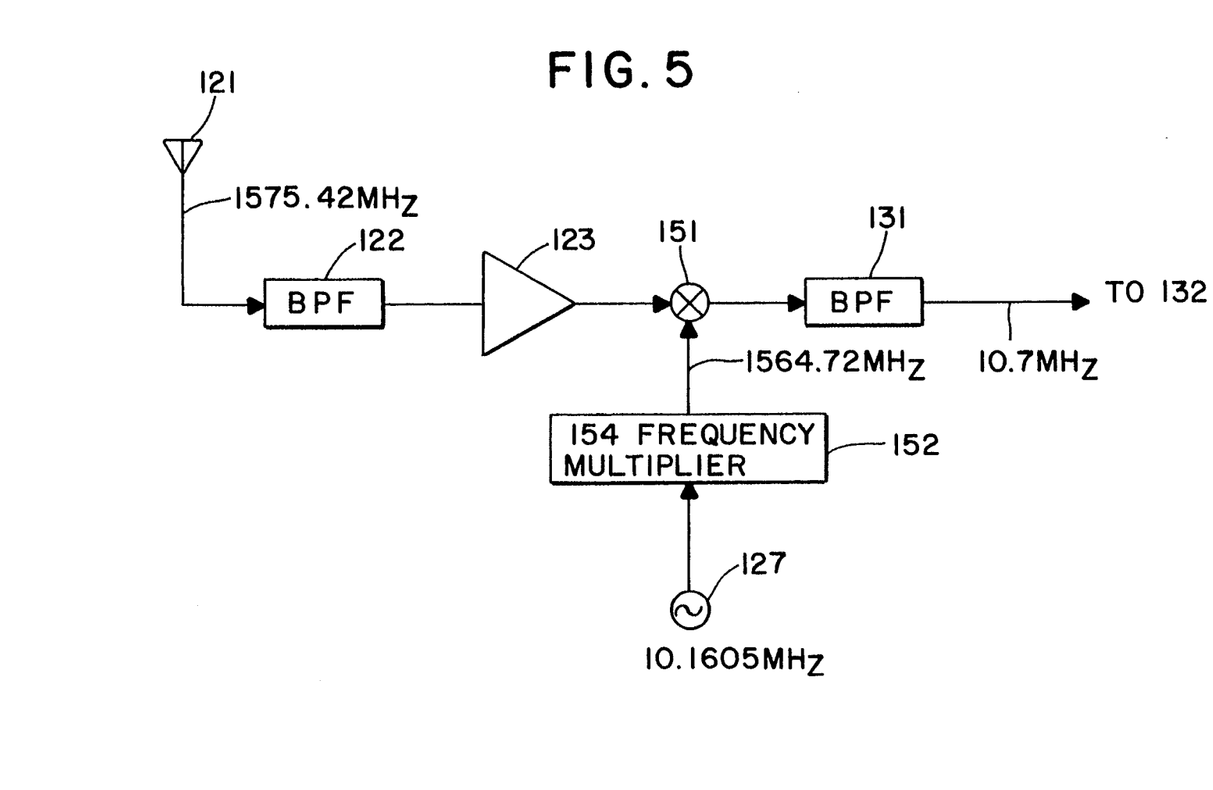
FIG. 5 is a block diagram of a main portion of a first modification of the second embodiment of the receiving device according to the present invention shown in FIG. 3, showing a detail thereof.

Referring to FIG. 5, those elements corresponding to elements of FIG. 3 utilize the same numerals. In detail, a frequency conversion mixer 151 shown in FIG. 5 is used to perform a frequency conversion for obtaining the IF signal (10.7 MHz).

When the IF signal having a frequency of 10.7 MHz is to be obtained by using a local oscillator having an oscillation frequency equal to that used in the second embodiment shown in FIG. 3, a frequency multiplier 152 having multiplier of 154 (N=N1+N2) is used.

Comparing the receiving device shown in FIG. 5 with the device shown in FIG. 3, it is clear that the device shown in FIG. 5 is much simpler. On the other hand, in the case where the double superheterodyne construction is used as in the embodiment shown in FIG. 3, it is possible o reliably select the required frequency component by means of the BPFs 122 and 131 and efficient amplification can be performed by the AGC circuit 128, etc., without degrading various receiving performances such as image disturbance, although its construction is a little more complicated than the case of the single superheterodyne construction.

[Modification 2]

Figure 6:
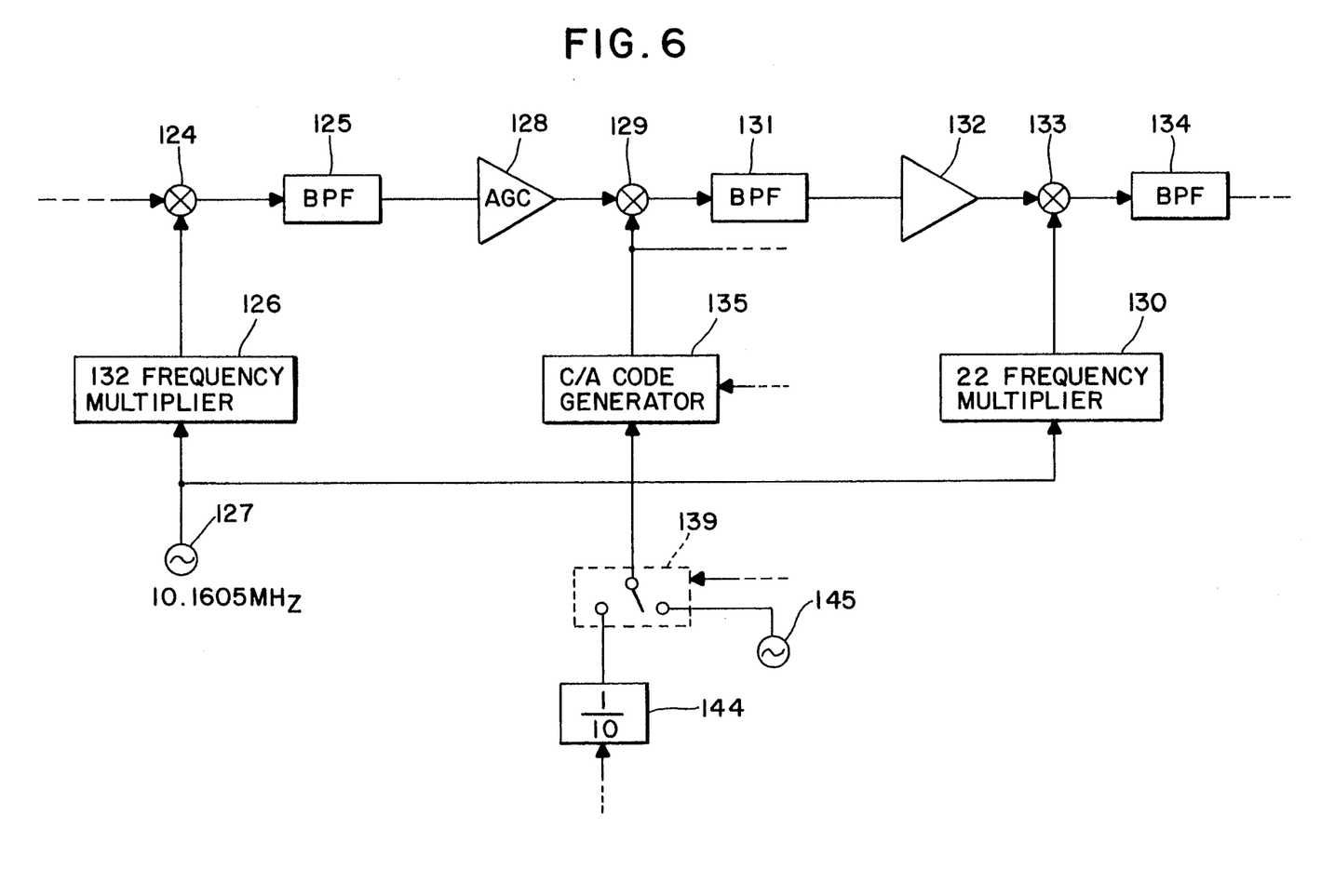
FIG. 6 is a block diagram of a main portion of a second modification of the second embodiment of the receiving device according to the present invention shown in FIG. 3, showing a detail thereof.

The construction shown in FIG. 3 may be changed to that shown in FIG. 6. That is, substantially the same performance can be obtained by using the output of the C/A code generator 135 as the input signal to the mixer 129 rather than the output of the frequency multiplier 130. Also the output of the frequency multiplier 130 is used as the input to the multiplier 133 rather than the output of the C/A code generator 135.

Further, the Ex-OR gate used in each of the described embodiments can be replaced by a multiplier.

As described above, according to the present invention, efficient amplification is performed without degrading various receiving performances such as selection of required frequency component and image disturbance by performing the frequency conversion by using the double superheterodyne construction in the receiving device. Therefore, an inexpensive ceramic filter of 10.7 MHz which is under mass-production as for intermediate frequency signal circuit can be used.

Further, the conventional sync holding device for keeping C/A code synchronized is unnecessary and a signal synchronized with an atomic clock of a GPS satellite can be produced without using any special circuit therefor, resulting in the following merits:

(1) Quick synchronization is possible since any time-consuming synchronization and synchronization holding circuit such as in the conventional circuit is not used as the circuit for synchronization of C/A code and holding the synchronization.

(2) Since the clock signal of the C/A code is obtained by utilizing the reproduced carrier whose noise and/or jitter is small due to the fact that the band characteristics of the PLL of the carrier reproducing circuit is narrow, it is possible to output a highly stable C/A code with minimum jitter.

(3) With such highly stable C/A code, sensitivity in receiving a GPS satellite signal is improved relatively, causing the demodulation performance to be improved, and a position measurement is possible even when the input signal is weak.

What is claimed is:

1. A receiving device for receiving and demodulating spread spectrum-modulated GPS electromagnetic waves from GPS satellites comprising:

C/A code generator means for generating a C/A code corresponding to that of an aimed GPS satellite on a basis of a clock signal;

frequency conversion means for converting said received GPS electromagnetic wave into at least one intermediate frequency signal by means of a local oscillation signal;

despread-demodulation means for obtaining a PSK signal by performing a despread-demodulation by multiplying said intermediate frequency signal with said C/A code;

carrier reproduction means for reproducing a carrier of the PSK signal from said PSK signal;

clock signal generator means for generating a clock signal from said reproduced carrier and said local oscillation signal and supplying said clock signal to said C/A code generator means; and demodulation means for demodulating GPS data from a frequency of said reproduced carrier and said PSK signal.

2. The receiving device claimed in claim 1, wherein said carrier reproducing means includes a phase locked loop circuit.

3. The receiving device claimed in claim 1, wherein said clock signal generator means comprises:

first frequency divider means for dividing the frequency of said reproduced carrier to provide a first frequency divided signal;

second frequency divider means for dividing the frequency of said local oscillation signal to provide a second frequency divided signal;

operation means for receiving said first and second frequency divided signals and providing an output signal; and means for producing a clock signal from said output signal of said operation means and supplying said produced clock signal to said C/A code generator means.

4. The receiving device claimed in claim 3, wherein said operation means of said clock signal generator means includes an Ex-OR gate.

5. The receiving device claimed in claim 1 wherein said frequency conversion means includes:

first frequency conversion means for converting said received GPS electromagnetic wave into a first intermediate frequency signal by means of said local oscillation signal;

second frequency conversion means for converting said first intermediate frequency signal obtained from said first frequency conversion means into a second intermediate frequency signal by means of said local oscillation signal; and said despread-demodulation means obtains said PSK signal by performing said despread-demodulation by multiplying said second intermediate frequency signal with said C/A code.

6. The receiving device claimed in claim 5 wherein said carrier reproducing means includes a phase locked loop circuit.

7. The receiving device claimed in claim 5, wherein said first frequency conversion means includes first frequency multiplier means for multiplying the frequency of said local oscillation signal by a first multiplier (N1);

said second frequency conversion means includes second frequency multiplier means for multiplying the frequency of said local oscillation signal by a second multiplier (N2);

said clock signal producing means includes frequency divider means for dividing the frequency of said reproduced carrier; and wherein a multiplier (N) obtained by adding the first multiplier (N1) to the second multiplier (N2) and a frequency divisor of said frequency divider means are equal to a multiplier of a reference signal multiplier means for producing a carrier by multiplying a reference signal from a reference signal generator means in said GPS satellite, respectively.

8. The receiving device claimed in claim 5, wherein said clock signal generator means comprises:

first frequency divider means for dividing the frequency of said reproduced carrier to provide a first frequency divided signal;

operation means for receiving said first frequency divided signal and said local oscillation signal and providing an output signal having a frequency equal to that of the reference signal from said reference signal generator means in said GPS satellite;

second frequency divider means for dividing the frequency of said output signal of said operation means; and means for producing a clock signal from an output of said second frequency divider and supplying said produced clock signal to said C/A code generator means.

9. The receiving device claimed in claim 8, wherein said operation means of said clock signal generator means includes an Ex-OR gate.

10. A method of receiving and demodulating spread spectrum-modulated GPS electromagnetic waves from GPS satellites comprising the steps of:

generating a C/A code corresponding to that of an aimed GPS satellite on a basis of a clock signal;

converting said received GPS electromagnetic wave into at least one intermediate frequency signal by means of a local oscillation signal;

obtaining a PSK signal by multiplying said intermediate frequency signal with said C/A code to perform a despread-demodulation;

reproducing a carrier of the PSK signal from said PSK signal;

producing a clock signal from said reproduced carrier and said local oscillation signal; and demodulating GPS data from said reproduced carrier and said PSK signal.

11. A method of receiving and demodulating spread spectrum-modulated GPS electromagnetic waves as claimed in claim 10 wherein said frequency conversion includes the steps of:

converting said received GPS electromagnetic wave into a first intermediate frequency signal by means of said local oscillation signal;

converting said first intermediate frequency signal into a second intermediate frequency signal by means of said local oscillation signal; and obtaining said PSK signal by multiplying said second intermediate frequency signal with said C/A code to perform said despread-demodulation.

* * * * *